UNITED STATES PATENT OFFICE 2,345,539

SULPHO AMIDES OF CIS-ENDOMETHYLENE 3,6-Δ⁴-TETRAHYDRO PHTHALIC ACID

Paul P. McClellan, Old Greenwich, and Jack C. Bacon, Stamford, Conn., assignors to American Cyanamid Company, New York, N. Y., a corporation of Maine No Drawing. Application March 20, 1943, Serial No. 479,920

6 Claims. (Cl. 260—503)

This invention relates to new organic compounds; more particularly, to sulphonated amides of cis-endomethylene-3,6-Δ⁴-tetrahydrophthalic acid and to methods of preparing the same.

Although the mono- and diamides of cis-endomethylene-3,6-Δ⁴-tetrahydrophthalic acid have no activating group adjacent to the double bond in the ring, we have found that it is possible to sulphonate these mono- and diamides to yield a group of new compounds possessing wetting, foaming, emulsifying, detergent and other surface active properties.

The new compounds of our invention which may be prepared by the methods described hereinafter are believed to have the following structural formulas:

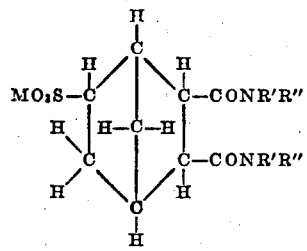

and

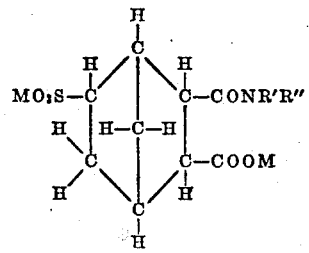

in which R' represents hydrogen or an alkyl, aryl or cycloalkyl radical, R" represents an alkyl, aryl or cycloalkyl radical and M represents a cationic salt-forming radical such as hydrogen, —NH₄ or a metallic or organic base radical. The MO₃S— group may, of course, take either the 4 or 5 position in the ring.

We prefer to prepare these new compounds by sulphonating the mono- or diamides of cis-endomethylene-3,6-Δ⁴-tetrahydrophthalic acid. When sulphonating the monoamide, we ordinarily use an alkaline sulphite and when sulphonating the diamide an alkaline bisulphite is used. These sulphites or bisulphites are generally employed by us in the form of their sodium, potassium, or ammonium salts since these particular salts are most readily available. The sulphonation of these mono- and diamides is not easily brought about and the reaction mixture requires extensive heating in the presence of the sulphonating agent at the working temperatures available at atmospheric pressure. For example, the monoamide or diamide to be sulphonated is dissolved in a suitable solvent such as alcohol and water, or water alone, and the desired sulphite or bisulphite is added in theoretical amounts or, preferably, more. The sulphonation is brought about by heating the reaction mixture in a vessel fitted with a reflux condenser until sulphonation is complete. Under these conditions the reaction mixture must be heated for a day or more to bring about substantially complete sulphonation of the amide. Addition of small amounts of a wetting agent, such as di-octyl sodium sulphosuccinate, brings about more intimate contact between the reactants and allows the sulphonation to be completed in a shorter period of time.

The sulphonation of the mono- or diamide may also be brought about by dissolving the desired amide in an aqueous or alcoholic solution of an alkali and passing gaseous SO₂ through the reaction mixture. Still another and faster method of sulphonation involves the use of a pressure autoclave whereby higher sulphonating temperatures may be obtained. This procedure is illustrated in the specific examples. Of course, sulphonation catalysts, such as nitrites, may also be employed to speed up sulphonation.

An alternative method of preparing our new compounds is to react cis-endomethylene-3,6-Δ⁴-tetrahydrophthalic acid, or its anhydride, with a solution of caustic soda to obtain the di-sodium salt. This compound may then be sulphonated with sodium bisulphite and the reaction product thereof treated with acids to remove the sodium groups. The resulting product, cis-endomethylene-3,6-sulfo 4-hexahydrophthalic acid may then be heated with one or two molecular equivalents of a primary or secondary amine to yield the corresponding monoamide or diamide. Further heating of the product results in formation of the imide. An analogous method of preparing these new compounds involves the sulphonation of the mono- or di-ester of cis-endomethylene-3,6-Δ⁴-tetrahydrophthalic acid with an alkaline sulphite or bisulphite followed by replacement of the ester group, or groups, with an amine.

Although the mono- and diamides of cis-endomethylene-3,6-Δ⁴-tetrahydrophthalic acid may be prepared by known methods the preparation of representative ones are given in the specific examples. In general, the preparation involves merely the heating of one or two molecular equivalents of a primary or secondary amine with cis-endomethylene-3,6-Δ⁴-tetrahydrophthalic acid until the formation of the amide is complete. A wide variety of primary and secondary amines may be employed in this reaction to yield mono- and diamides of cis-endomethylene-3,6-Δ⁴-tetrahydrophthalic acid suitable for sulphonation. Specifically; methyl amine, ethyl amine, propyl amine, butyl amine, isopropyl amine, amyl amine, diamyl amine, n-octyl amine, di(n-octyl) amine, 2-ethylhexyl amine, decyl amine, dodecyl amine, di dodecyl amine, tetradecyl amine, octadecyl amine, phenylene diamine, naphthyl amine, benzyl amine, alkyl substituted anilines, cyclo-hexyl amines, amoxypropyl amine, caproxypropyl amine, undecoxypropyl amine, 1-methyl-4-ethyl hexoxypropyl amine, dodecyl amino-propyl amine, cyanethyl amine, monoethanol amine, diethanol amine, propanol amine, and many others may be used.

The catonic salt-forming radical may be one such as the radical of sodium, potassium, ammonium, lithium, calcium, zinc, copper, mercury, cadmium, magnesium, ethyl amine, ethanol amine, guanidine, pyridine, morpholine etc. These radicals may be introduced into the compound during the sulphonation step, by neutralization of the free sulphonic acid with a suitable salt-forming base carrying one of these radicals or by methods of double decomposition with the sodium salt of an amide of cis-endomethylene-3,6-sulpho-4-hexahydrophthalic acid.

The sulphonated mono- and diamides of cis-endomethylene-3,6-Δ⁴-tetrahydrophthalic acid are of value primarily because of their wetting, foaming, dispersing and detergent properties. Those mono- and diamides in which the amide group contains one or more alkyl chains of 4 or more carbon atoms possess the best surface active properties. These compounds are therefore, particularly useful in those many arts in which compounds having surface active properties have been found useful; for example, in detergent compositions, breaking of petroleum emulsions, ore flotation processes, in processing and improving textiles, as dye assistants, in the leather industry, in dispersing pigments, dyes, etc., in the preparation of emulsions, in insecticides and fungicides and many other like relationships.

Specific examples will now be given to illustrate in greater detail the preparation of diamides and monoamides of cis-endomethylene-3,6-Δ⁴-tetrahydrophthalic acid and their subsequent sulphonation using both sulphites and bisulphites. It should be understood that the invention is not limited to these particular examples which are given by way of illustration and not in limitation.

*Example 1*

N-monolauryl cis-endomethylene-3,6-Δ⁴-tetrahydrophthalamic acid was prepared by heating a mixture of 43.5 parts by weight of cis-endomethylene-3,6-Δ⁴-tetrahydrophthalic anhydride and 56.5 parts of lauryl amine to 115-20° C. for fifteen minutes while stirring vigorously. When cool the product was a light brown viscous oil.

The sulphonation of this product was carried out by heating an emulsion of 18.5 parts of the amide in 22.5 parts of alcohol and 45 parts of water with 14 parts of sodium sulphite on a steam bath. The reaction mixture was heated for eighty-six hours while stirring. At the end of this time the thick emulsion which had formed was extracted with ether, and the aqueous layer evaporated to dryness on the steam bath. The yield was 16.6 parts of a light tan solid believed to have the following formula:

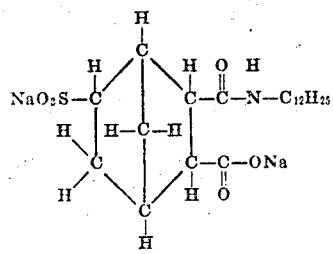

This product was found to have excellent wetting, foaming, and detergent properties. When evaluated by means of the standard Draves sinking test, a skein of unbleached cotton yarn was completely wetted-out by a one-half percent solution of the product in 75.4 seconds. A dilute solution of the product foamed strongly when shaken to yield copious suds which remained stable over a period of more than 10 minutes. The calcium tolerance of aqueous solutions of the product was also found to be excellent. A solution containing 1.25 grams per liter of the sulphomonoamide tolerated 2250 parts of calcium ion expressed as calcium carbonate per million parts of solution without showing signs of precipitation.

*Example 2*

A mixture of 56 parts of cis-endomethylene-3,6-Δ⁴-tetrahydrophthalic anhydride and 44 parts of n-heptyl amine was heated to 115-120° C. for fifteen minutes. The resulting monoamide was a pale-yellow, viscous liquid.

N-n-heptyl cis-endomethylene-3,6-Δ⁴-tetrahydrophthalamic acid was sulphonted by heating a mixture consisting of 18 parts of the amide, 9 parts of sodium sulphite, 23 parts of alcohol and 50 parts of water at 120° C. for eight hours in an autoclave. The resulting emulsion was diluted with water, extracted with ether and the aqueous layer evaporated to dryness on the steam bath. The yield was 8 parts of a white solid having surface active properties. The formula was believed to be:

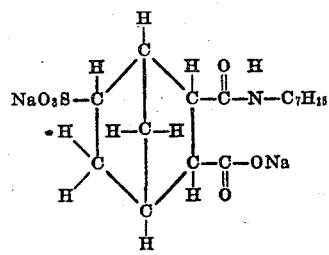

The product was easily dissolved in water to give a clear solution having a calcium tolerance of more than 2250 parts per million at a concentration of 1.0 gram per liter.

*Example 3*

N,N'-di(n-heptyl) cis-endomethylene-3,6-Δ⁴-tetrahydrophthalamide was prepared by heating 25 parts of dimethyl cis-endomethylene-3,6-Δ⁴-tetrahydrophthalate with 75 parts of n-heptyl amine under reflux for six hours. The low boiling fraction was distilled off and the reflux continued for an additional five hours. The excess amine was removed under reduced pressure leaving a brown residue. This was dissolved in alcohol and filtered. The filtrate was washed with dilute acetic acid in order to remove any excess amine and then the upper layer which solidified was removed. This was recrystallized from an equal volume of acetone.

Ten and one-half parts of the N,N′ di(n-heptyl) amide of cis-endomethylene-3,6-Δ⁴-tetrahydrophthalic acid was heated in an autoclave for eight hours at 120° C. with 5.3 parts of sodium bisulphite and 42 parts each of alcohol and water. At the end of the reaction time the unreacted amide and sodium bisulphite were filtered and the filtrate evaporated to dryness. The yield was 7 parts of an orange solid which exhibited wetting properties. The formula of this product was believed to be:

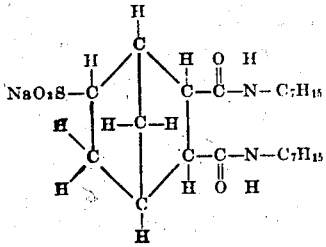

This product was easily soluble in water to give clear solutions having a calcium tolerance at 1 gram per liter of more than 2250 parts per million of $CaCO_3$.

This application is a continuation-in-part of our copending application Serial No. 371,594, filed December 24, 1940, now Patent Number 2,314,846, issued March 23, 1943.

We claim:

1. An amide of sulphonated cis-endomethylene-3,6-Δ⁴-tetrahydrophthalic acid.
2. An aliphatic monoamide of sulphonated cis-endomethylene-3,6-Δ⁴-tetrahydrophthalic acid.
3. An aliphatic diamide of sulphonated cis-endomethylene-3,6-Δ⁴-tetrahydrophthalic acid.
4. An alkyl amide of sulphonated cis-endomethylene-3,6-Δ⁴-tetrahydrophthalic acid in which the alkyl group contains at least 4 carbon atoms.
5. Disodium N-monolauryl cis-endomethylene-3,6-sulpho-4-hexahydrophthalate.
6. A process for the production of sulphonated amides of cis-endomethylene-3,6-Δ⁴-tetrahydrophthalic acid which comprises heating an amide of cis-endomethylene-3,6-Δ⁴-tetrahydrophthalic acid with a member of the group consisting of water-soluble sulphite and bisulphite salts.

PAUL P. McCLELLAN.
JACK C. BACON.